US005348995A

United States Patent [19]
Anderson

[11] Patent Number: 5,348,995
[45] Date of Patent: Sep. 20, 1994

[54] AMINE-FREE INTERNAL ANTISTATIC AGENT

[75] Inventor: Barbara J. Anderson, Saltsburg, Pa.

[73] Assignee: PPG Industries, Inc., Pittsburgh, Pa.

[21] Appl. No.: 38,328

[22] Filed: Mar. 29, 1993

[51] Int. Cl.$^5$ ................................................. C08K 5/20
[52] U.S. Cl. ..................... 524/157; 524/232;
524/238; 524/910; 524/913; 554/68; 554/69
[58] Field of Search ............... 524/232, 238, 157, 910, 524/913; 554/69, 68

[56] References Cited

U.S. PATENT DOCUMENTS 2,897,170  7/1959  Gruber .
3,117,113  1/1964  Tudor .
3,972,855  8/1976  Martinsson et al. .
5,098,939  3/1992  Sienkowski et al. .

FOREIGN PATENT DOCUMENTS 73017860  2/1974  Japan .
63-227643  9/1988  Japan .
4351527    5/1991  Japan .

Primary Examiner—Joseph L. Schofer
Assistant Examiner—Jeffrey T. Smith
Attorney, Agent, or Firm—Donna L. Seidel

[57] ABSTRACT

A novel amine-free antistatic agent comprising the reaction product of diethanolamine and a fatty acid or fatty acid ester, neutralized with a strong acid is disclosed, along with plastic composition treated with said antistatic composition, as well as a method for making the antistatic composition and methods for using it to produce plastic articles with antistatic properties.

12 Claims, No Drawings

AMINE-FREE INTERNAL ANTISTATIC AGENT

The invention relates generally to internal antistatic agents, and particularly to amide-based antistatic agents.

Organic polymers, e.g. synthetic polymers, are essentially electrical insulators, i.e. non-conductors of electricity. Articles prepared from such polymers tend to develop electrostatic charges upon their surfaces when they are in a dry state and subjected to friction during their production and finishing or during their handling and use. Such static charges are undesirable for a number of reasons. For example, surface static charges readily attract dust and other contaminants, which are unsightly and difficult to clean. Often the contaminants or static charges themselves cause processing or handling problems. In certain cases, static charges may accumulate to a level where an electric shock is experienced when the article is handled. Further, a high level of static charge on a molded part covering sensitive electronic equipment can damage such equipment.

Quaternary ammonium compounds have been used to impart antistatic properties to organic polymeric materials, e.g. polyvinyl chloride, and are described in U.S. Pat. Nos. 2,897,170; 3,117,113 and 3,972,855. However, use of quaternary ammonium compounds tends to cause discoloration. Tertiary amines, especially hydroxy alkylated alkyl amines, have also been used as antistatic agents; however, they are not very effective in reducing surface resistivity at very low humidities.

Consequently, there is a need for a chemical additive that reduces the surface resistivity in organic polymers, i.e. plastics, and also meets the following criteria:

(1) is thermally stable at the process temperature of the particular plastic;
(2) does not catalyze the decomposition of the polymer nor impart any undesirable color to the product;
(3) is very active and reduces the surface resistivity to charge dissipative range even at a relative humidity of 15% or less;
(4) is easily handled and easily distributed within the body of the polymer;
(5) does not bloom to the surface to give a tacky or oily feeling, and is not easily washed off;
(6) does not interfere with printability; and
(7) is cost effective.

Since amines are not always desirable, as they may have a deleterious effect on electrical properties in some applications, or on the plastic itself, such as crazing of polycarbonate, amides are preferable to amines for some applications. Diethanol amides of long chain monocarboxylic acids are known in the art as antistatic compounds (hereinafter "antistats") useful for incorporation into polyolefin polymers, especially polyethylene, polypropylene and/or copolymers of ethylene and propylene. One particularly demanding use for polyethylene containing such an antistat is as packaging material for electronic components comprised of polycarbonate.

The commercial process for producing diethanol amide of long chain monocarboxylic acid comprises two separately conducted steps. In the first step, diethanolamine (DEA) and a long chain monocarboxylic acid alkyl ester (for example, methyl laurate) are reacted in the presence of an excess of the diethanolamine to produce a mixture comprising the diethanol amide of the long chain monocarboxylic acid and diethanolamine. Since the reaction otherwise tends to proceed only slowly, it is often conducted in the presence of a catalytic amount of a basic catalyst such as sodium methoxide which increases the reaction rate. The excess diethanolamine also serves to increase the reaction rate and to drive the reaction to substantial completion. In the case of methyl laurate, the temperature of the reaction is above the boiling point of methanol under the prevailing pressure, and the reaction is customarily conducted under a slight vacuum with a nitrogen purge to sweep the methanol away substantially as it is formed. However, the excess diethanolamine is not removed. Diethanolamine is not itself an antistat and its presence in excess serves to dilute the antistatic properties of the composition. Most importantly, however, diethanolamine, like any amine, reacts with the polycarbonate of the electronic components the packaging was intended to protect.

The second step of the commercial process therefore converts the residual diethanolamine to a material less harmful to polycarbonate. Long chain monocarboxylic acid (for example, lauric acid) is added to the first reaction mixture and reacted with the residual diethanolamine to form the long chain monocarboxylic salt of diethanolamine, which ordinarily constitutes from about 5 to about 10 percent by weight of the product prepared in the second step. The ammonium salt is not itself an antistat and its presence dilutes the antistatic properties of the diethanol amide product composition.

The amide product prepared as described above is often compounded with polyethylene at elevated temperatures; but at such temperatures the antistat composition does not have good thermal stability and a good deal of the ammonium salt degrades and forms volatile by-products, e.g., diethanolamine, which attack the polycarbonate. Moreover, although the ammonium salt of fatty acid does not degrade polycarbonate as does diethanolamine, it can induce the corrosion of copper, solder, and other parts of the electronic components. Electronic components, and especially assembled circuit boards containing electronic components, are usually expensive and often must be stored for long periods of time in their packaging. The presence of more than inconsequential amounts of the ammonium salt of fatty acid renders the composition generally unfit for use in polyethylene packaging of electronic components and assembled circuit boards containing electronic components. For this reason, the electronics packaging industry requires antistats that are substantially free from amines, fatty acids and/or their salts.

U.S. Pat. No. 5,098,939 to Sienkowski et al. discloses reacting diethanolamine and triglyceride to produce a mixture comprising diethanol amide of monocarboxylic acid and hydroxy-functional glyceride. The reaction mixture is disclosed to be useful as an antistatic composition for formulating with polymers, especially polyolefins. The hydroxy-functional glyceride does not induce corrosion of copper or other materials normally present in electronic components. Since the hydroxy-functional glyceride co-product has some antistatic properties of its own, although ordinarily not as pronounced as those of the diethanol amide, it has a lesser tendency than a non-antistat to dilute the antistatic properties of an antistatic composition containing the diethanol amide.

Antistatic compositions comprising diethanol amides are useful with various plastics; however, any amine in such compositions, whether residual from the initial reaction mixture or a product of the degradation of an ammonium salt or complex, may have deleterious effects on some materials, e.g. electrical properties in electronics components and crazing of polycarbonate.

The present invention provides a substantially amine-free antistatic agent which is effective in polyethylene, both high density and low density, and both homopolymers and copolymers, but is especially effective for use with polycarbonate because the absence of amine prevents crazing of polycarbonate. In addition to polycarbonate compatibility, the antistatic agent of the present invention enhances electrical performance, as measured by the surface resistivities of films incorporating the amine-free antistatic agent of the present invention.

The antistatic agent of the present invention is produced by reaction of diethanolamine (DEA) and a fatty acid or fatty acid ester, particularly coconut fatty acid or the methyl ester thereof, to form an amide reaction product. The fatty acid or fatty acid ester is preferably a monocarboxylic acid of the general formula RCOOH or an alkyl ester of the general formula RCOOR', wherein R represents the aliphatic hydrocarbon portion of a fatty acid containing from 6 to 24 carbon atoms, e.g. R represents monovalent aliphatic hydrocarbon radicals containing from 5 to 23 carbon atoms, and R' is a lower alkyl, for example $C_1$ to $C_4$, group. Preferably, R represents aliphatic hydrocarbon radicals having from about 7 to about 20 carbon atoms. More preferably, R represents aliphatic hydrocarbon radicals containing primarily from about 7 to about 17 carbon atoms. R' is preferably methyl.

The aliphatic hydrocarbon portion R may include both linear and branched aliphatic radicals, may include some minor amount of unsaturation, and further may include mixtures of aliphatic radicals within the described carbon chain length, as is found, for example, in fatty acids derived from natural fats or oils. Fatty acids used in the present process may be prepared synthetically, but are conveniently available as the mixed fatty acids derived from naturally occurring vegetable fats and oils, such as coconut oil, palm oil, babassu oil, castor oil, olive oil, peanut oil, rape seed oil, corn oil, sesame seed oil, cotton seed oil, soybean oil, sunflower seed oil, safflower seed oil and hemp oil (hydrogenated and unhydrogenated). Lauric, caprylic, caproic, myristic, palmitic, stearic, palmitoleic and oleic acids also can be used, alone or in admixture, or in substitution for a part of the fatty acid reactant. Fatty acids derived from coconut oil, which comprise a mixture of principally $C_8$–$C_{18}$ fatty acids represent the preferred fatty acid reactant.

It is possible to back neutralize or complex the excess amine in the amide reaction product into a weak soap; however, such a weak complex may be broken, resulting in reformation of amine.

In accordance with the present invention, the excess amine in the amide reaction product is back neutralized with a strong acid, i.e. one which completely dissociates in aqueous solution. By back neutralizing the amine with a strong acid, instead of a weak fatty acid which forms a weak complex which may dissociate to reform amine, a stable amine-free antistatic agent is produced. Suitable strong acids may include inorganic acids such as nitric, hydrochloric, sulfuric, and phosphoric acids. Preferred strong acids are sulfonic acids and derivative compounds such as methane sulfonic acid and methyl paratoluenesulfonate. Most preferred is dodecylbenzenesulfonic acid (DDBSA). Commercially available dodecylbenzenesulfonic acid is a benzenesulfonic acid in which the alkyl substituent on the benzene ring is a mixture of $C_{10}$ to $C_{13}$ alkyl groups, the nominal number of carbon atoms being about 12.

The fatty acid, RCOOH, e.g. coconut fatty acid, wherein R is principally $C_7$ to $C_{17}$, is reacted with diethanolamine (DEA), preferably in the presence of a catalyst, e.g. sodium methylate, to form an amide according to the following reaction.

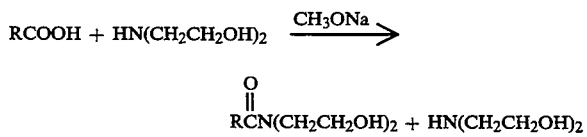

The starting reaction mixture may comprise the fatty acid and DEA in any proportion, but preferably comprises from 20 to 80 weight percent of the fatty acid. A most preferred weight ratio of acid to amine is about 65:35 to produce the amide. The starting reaction mixture may, in an alternative embodiment, comprise a fatty acid ester, RCOOR' wherein R' may be a lower alkyl, such as $C_1$ to $C_4$, preferably methyl, in which case alcohol, R'OH, typically methanol, is also formed in the reaction product mixture as follows.

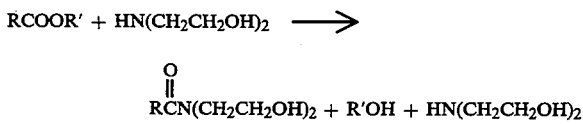

The reaction product mixture is then further reacted with a strong acid, e.g. dodecylbenzenesulfonic acid, to form a strong complex which does not dissociate, to prevent the reformation of any residual amine, according to the following reaction.

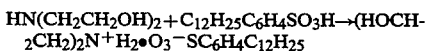

The final amide reaction product typically has an acid value of about 30, and an amine value of essentially zero, as determined by acid-base titration with 0.25N hydrochloric acid in isopropanol, using Bromophenol Blue indicator.

The antistatic composition of the invention may be used to minimize the accumulation of static electricity on non-conducting articles, e.g. articles prepared from synthetic polymers, by applying to the surface of or incorporating within the article an effective antistatic amount of the invention composition. Generally, the antistatic compositions of the invention may be incorporated within the article in amounts of between about 0.1 and about 10 weight percent and preferably are used in amounts of between about 2 and about 6 weight percent, based on the weight of the dry, untreated article. When associated with a finish composition, as described below, the antistatic compositions are generally present in amounts of from about 0.05 to about 5, e.g. 0.5 to 1, weight percent.

To apply the composition topically to the surface of an article, the composition is dissolved or dispersed in water, lower alkanol, e.g. a $C_1$ to $C_4$ alcohol, lubricating oil, polymeric coating, other organic solvent, etc. and the resulting finish composition containing the desired amount of antistatic composition applied to the surface using conventional coating techniques, e.g. spraying, dipping, wiping, etc., thereby to deposit an effective amount of antistatic agent on the surface of the article. In general, the antistatic compositions of the invention are thermally stable at temperatures in excess of 150° C., e.g. 200° C.

When the antistatic compositions are incorporated internally into an article, the compositions may be mixed in antistatic amounts with the synthetic polymer or other material by conventional blending or mixing equipment, e.g. Banbury mixers or other rubber and plastic processing equipment, and the mixture formed into the article, e.g. by extrusion or other molding procedure. Alternatively, a master batch of the polymer and antistatic composition may be prepared and the master batch added in antistatic amounts to synthetic polymer that is to be formed into an article, thereby to provide the desired antistatic amount of antistatic composition within the article. A master batch may conveniently contain between about 5 and about 30 percent by weight of the antistatic composition.

The compositions of the invention may be used with conventional synthetic polymers utilized to prepare formed articles. The compatibility of the antistatic compositions with a particular synthetic polymer may be readily determined by those skilled in the art. The antistatic compositions may be used in a wide spectrum of substrate shapes, such as fibers (woven and nonwoven), sheets, films and molded or extruded articles. Such articles may be prepared from thermoplastic or thermosetting polymers or copolymers (including terpolymers).

Non-limiting examples of synthetic polymers from which formed articles may be prepared include polyolefins, such as polyethylene, polypropylene and polyisobutylene, styrene resins such as polystyrene, poly(chlorostyrene), styrene-acrylonitrile copolymers, poly(styrene-acrylonitrile-butadiene) terpolymers (ABS resins) and high impact polystyrene (HIPS), polyesters such as poly(methylacrylate), poly(methylmethacrylate) and poly(vinylacetate), ethylene glycol-terephthalic acid polymers, polycarbonates, polyamides such as nylon and Kevlar ® type polyamides, polyacetals such as poly(vinylbutyral), phenol-formaldehyde resins, vinyl resins, such as poly(vinyl chloride), poly(vinylidene chloride), polytrifluorochloroethylene, copolymers of vinyl chloride with vinyl acetate, vinylidene chloride, or acrylonitrile, polyurethanes, and poly(phenylene ether) resins. Mixtures of the aforesaid polymers may also be used, e.g. polymer alloys.

In addition, the invention composition may be used with natural materials or mixtures of natural and synthetic materials, e.g. rayon, acetate, rayon-cellulosic materials such as cellulose acetate-propionate, cellulose-butyrate, cotton, linen, jute, ramie, wool, mohair and glass, e.g. fiberglass and fiberglass insulation. The textile materials may take any form, including individual fibers, woven material such as fabrics, cloth, carpets, rugs and upholstery and non-woven materials such as felts, bats and mats. In the case of fiberglass strand or fiberglass insulation, the compositions may be applied topically as a finish or as part of a sizing composition.

The invention is more particularly described in the following examples, which are intended as illustrative only, since numerous modifications and variations will be apparent to those skilled in the art. The preferred reaction process is set forth in the immediately following example.

EXAMPLE A

Diethanolamine was reacted with methyl coconate under vacuum in the presence of sodium methylate to form the corresponding diethanol amide. The diethanolamine, which comprised 33.5 weight percent of the total reactants, approximately one-third of the methyl coconate, and the sodium methylate catalyst, which comprised 1 percent by weight of the total reactants, were charged into a dry reaction vessel equipped with a thermometer, distillation means and nitrogen purge. The mixture was reacted at 160° to 180° F. (71° to 82° C.) until a clear single phase was obtained. The remaining two thirds of the methyl coconate then was added gradually until the reaction was complete. Vacuum was then applied to the reaction vessel, and the temperature was gradually raised to 220° F. (104° C.) to distill off the methanol by-product. After the methanol by-product was removed, the reaction product mixture was mixed with dodecylbenzenesulfonic acid (DDBSA) in a ratio of 85 parts by weight amide reaction product mixture to 15 parts by weight DDBSA at 100° F. (38° C.). Reaction for about 20 minutes was sufficient for the product to yield an acid value of about 30 and a free amine value of zero.

COMPARATIVE EXAMPLE B

For comparison of static decay rates and effect on polycarbonate, a diethanol snide of methyl coconate was produced as in above Example A. After the methanol by-product was removed, the amide was neutralized with additional coconut fatty acid, rather than a strong acid in accordance with the present invention.

EXAMPLE I

Low density (0.920 gram/cm$^3$) polyethylene homopolymer films were prepared with the antistatic agents of Examples A and B by blending the polymer and respective antistatic agent in a Brabender mixer and forming sheets in a high pressure press for comparative evaluation of their static decay rates and surface resistivities. The static decay rates were measured in accordance with MIL SPEC B81705C, and the surface resistivities were measured in accordance with ASTM standard test methods published under the designation D257-78. The results are shown in the following table.

TABLE I

| Example | Neutralizing Acid | Static Decay Rates (sec) | | Surface Resistivities (ohms per square) | |
|---|---|---|---|---|---|
| | | Ambient | 12% R.H. | Ambient | 12% R.H. |
| A | DDBSA | 0.11 | 0.07 | $6.9 \times 10^{10}$ | $4.9 \times 10^{10}$ |
| B | fatty acid | 1.11 | 0.96 | $4.8 \times 10^{11}$ | $5.1 \times 10^{11}$ |

The above results also show that the amide neutralized in accordance with the present invention is a more effective antistatic agent, particularly at low relative humidity, than the same amide neutralized with fatty acid, and that it has lower surface resistivity, especially at low humidity.

EXAMPLE II

High density (0.960 gram/cm$^3$) polyethylene homopolymer films were formulated as in Example I with the two antistatic agents of Examples A and B for static decay tests. The static decay rates in this example were measured in accordance with MIL SPEC B81705C. The comparative results are shown in the following table.

TABLE II

| Example | Neutralizing Acid | Static Decay Rates (sec) | |
|---|---|---|---|
| | | Ambient | 12% R.H. |
| A | DDBSA | 1.18 | 1.46 |
| B | fatty acid | 1.75 | 2.2 |

The above test results show that the amide neutralized with strong acid in accordance with the present invention is a more effective antistatic agent, especially at low humidity, than the same amide neutralized with fatty acid.

EXAMPLE III

Polypropylene (copolymer with polyethylene, 0.960 gram/cm$^3$) films were prepared as in Example I with the antistatic agents of Examples A and B for comparison of their static decay rates, which are shown in the following table.

TABLE III

| Example | Neutralizing Acid | Static Decay Rates (sec) | |
|---|---|---|---|
| | | Ambient | 12% R.H. |
| A | DDBSA | 0.38 | 0.38 |
| B | fatty acid | 2.2 | 2.6 |

The above results show that the amide neutralized in accordance with the present invention is an even more effective antistatic agent for polypropylene than the same amide neutralized with fatty acid, especially at low relative humidity.

EXAMPLE IV

LEXAN® polycarbonate bars were stress tested in contact with low density (0.920 gram/cm$^3$) polyethylene homopolymer films prepared as in Example I containing the antistatic agents of Examples A and B for crazing tests. The crazing tests were performed by an independent laboratory using standard LEXAN® polycarbonate (PC) test bars according to "Standard Test Method for Chemical Compatibility of Polycarbonate" published by Plastics Technology Laboratories, Inc. The comparative results are shown in the following table.

TABLE IV

| | | Stress Crazing of Polycarbonate | | | | | | |
|---|---|---|---|---|---|---|---|---|
| Example | Neutralizing Acid | 73° F. (psi) | (23° C.) (Kg/cm$^3$) | 120° F. (psi) | (49° C.) (Kg/cm$^3$) | 158° F. (psi) | (70° C.) (Kg/cm$^3$) | 185° F. (psi) | (85° C.) (Kg/cm$^3$) |
| A | DBSA | 3400 | 239 | 2000 | 140.6 | 1000 | 70.3 | 1000 | 70.3 |
| B | fatty acid | 3400 | 239 | 2000 | 140.6 | 1000 | 70.3 | <1000 | <70.3 |

The above test results show that the amide neutralized with strong acid in accordance with the present invention is more compatible with polycarbonate, enduring greater stress at the highest test temperature (85° C.), than a comparable amide neutralized with fatty acid.

The above examples are offered to illustrate the present invention. The present invention is not limited to the specific fatty acids or fatty acid esters, strong neutralizing acids, polymers and copolymers, ratios, concentrations, etc. of the previous examples, but rather its scope is defined by the following claims.

I claim:

1. A substantially amine-free antistatic composition comprising the diethanolamide reaction product of a fatty acid or fatty acid ester and diethanolamine, which reaction product has been further neutralized with strong acid, wherein said fatty acid or fatty acid ester has the general formula RCOOR', wherein R is an aliphatic hydrocarbon radical or mixture of aliphatic hydrocarbon radicals comprising from 5 to 23 carbon atoms, and R' is an alkyl radical.

2. A composition according to claim 1, wherein the fatty acid or fatty acid ester is a coconut fatty acid comprising primarily $C_8$ to $C_{18}$ fatty acid compounds or an alkyl ester thereof, wherein R' is $C_1$ to $C_4$.

3. A composition according to claim 2, wherein the strong acid is selected from the group consisting of inorganic acids, sulfonic acids and sulfonic acid compounds.

4. A composition according to claim 3, wherein the sulfonic acid compound is selected from the group consisting of methane sulfonic acid, methyl paratoluenesulfonate and dodecylbenzenesulfonic acid.

5. A composition according to claim 4, wherein the compound is dodecylbenzenesulfonic acid.

6. A composition according to claim 1, wherein the ratio of fatty acid to diethanolamine is from 20 to 80 weight percent fatty acid to 80 to 20 weight percent diethanolamine.

7. A composition having antistatic properties comprising an organic polymer and the diethanolamide reaction product of a fatty acid or fatty acid ester and diethanolamine, neutralized with a strong acid, wherein the fatty acid or fatty acid ester has the general formula RCOOH or RCOOR', wherein R is an aliphatic hydrocarbon radical or mixture of aliphatic hydrocarbon radicals comprising from 5 to 23 carbon atoms, and R' is alkyl radical.

8. A composition according to claim 7, wherein the polymer is selected from the group consisting of polyethylene, polypropylene and polycarbonate and copolymers thereof.

9. A composition according to claim 7, wherein the fatty acid or fatty acid ester is a coconut fatty acid comprising primarily $C_8$ to $C_{18}$ fatty acid compounds, or an alkyl ester thereof, wherein R' is $C_1$ to $C_4$.

10. A composition according to claim 7, wherein the strong acid is dodecylbenzenesulfonic acid.

11. An essentially amine-free antistatic composition comprising the amide reaction product of diethanolamine and a fatty acid or fatty acid ester of the general formula RCOOH or RCOOR', wherein R is an aliphatic hydrocarbon radical or mixture of aliphatic hydrocarbon radicals comprising from 5 to 23 carbon atoms, and R' is an alkyl radical, and the neutralized reaction product of diethanolamine and a strong acid.

12. A composition according to claim 11, wherein the strong acid is dodecylbenzenesulfonic acid.

* * * * *